United States Patent
Chisamore et al.

(10) Patent No.: US 7,333,638 B2
(45) Date of Patent: Feb. 19, 2008

(54) MINUTIAE FINGERPRINT TRANSACTIONS

(75) Inventors: Seth B. Chisamore, Atlanta, GA (US); Christopher E. Holladay, Marietta, GA (US); Michael P. Outlaw, Dallas, GA (US); Matthew B. Trevathan, Kennesaw, GA (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 548 days.

(21) Appl. No.: 11/037,990

(22) Filed: Jan. 18, 2005

(65) Prior Publication Data
US 2006/0159316 A1    Jul. 20, 2006

(51) Int. Cl.
*G06K 9/00* (2006.01)
(52) U.S. Cl. .................... 382/124; 382/125
(58) Field of Classification Search ........ 382/124–126, 382/115; 340/5.52, 5.53, 5.82, 5.83; 358/486–497, 358/466; 250/234
See application file for complete search history.

(56) References Cited

U.S. PATENT DOCUMENTS

| | | | |
|---|---|---|---|
| 5,845,005 A * | 12/1998 | Setlak et al. ................. | 382/124 |
| 6,088,585 A | 7/2000 | Schmitt et al. | |
| 6,236,741 B1 * | 5/2001 | Kovacs-Vajna ............. | 382/125 |
| 6,272,562 B1 | 8/2001 | Scott et al. | |
| 6,657,538 B1 | 12/2003 | Ritter | |
| 7,233,685 B2 * | 6/2007 | Miyasaka et al. ........... | 382/124 |
| 2002/0052192 A1 | 5/2002 | Yamazaki et al. | |
| 2003/0129965 A1 | 7/2003 | Siegel | |
| 2004/0096086 A1 * | 5/2004 | Miyasaka et al. ........... | 382/124 |
| 2006/0120578 A1 * | 6/2006 | Shatford ..................... | 382/125 |

OTHER PUBLICATIONS

Web page, Fujitsu launches laptop fingerprint-recognition card, Apr. 2004.
Web page, Laptop to offer fingerprint ID—Toshiba, Apr. 2004.
Web page, Samsung P25 XVC 220 Fingerprint, Apr. 2004.
Web page, Eyewatch.com protect your laptop with biometric login, Apr. 2004.
Web page, STMicroelectronics TouchChip fingerprint biometric suite protects MPC's newest laptops, Apr. 2004.
Web page, Suprema-Best Fingerprint Solutions Provider, Apr. 2004.
Web page, Cyberguys.com—p. 44 Biostick USB fingerprint scanning technology, Apr. 2004.

* cited by examiner

*Primary Examiner*—Brian Le
(74) *Attorney, Agent, or Firm*—Scully, Scott, Murphy & Presser, P.C.

(57) ABSTRACT

Minutiae based fingerprint transactions are validated and authenticated over wireless based communications systems, such as over a Bluetooth wireless based communication system. Minutiae points are unique identification points on a fingerprint where a ridge in the fingerprint joins another ridge or a ridge ends. The combination of any three minutiae points forms a triangle, and the method/algorithm of the present invention uses triangles of minutiae points because triangles are proportional regardless of possible differences in scale of two fingerprints being compared. A first method/algorithm uses a minutiae exchange where triplets of minutiae points are exchanged and form triangles for comparison between an original template of minutiae points and a stored template of minutiae points. A second method/algorithm exchanges three linear equations for three pairs of minutiae points that form triangles for comparison between an original template and a stored template.

20 Claims, 2 Drawing Sheets

MINUTIAE FINGERPRINT TRANSACTIONS

BACKGROUND OF THE INVENTION

1. Field of the Invention

The present invention relates generally to minutiae based fingerprint transactions, and more particularly pertains to methods of authenticating fingerprints in transactions conducted over wireless or wire based communication systems.

2. Discussion of the Prior Art

Financial institutions are presently investigating the gathering of financial data using wireless communications and a unique private key. Mastercard is currently running trials on a wireless transaction system using RFID tags wherein the RFID tag is swiped across a payment scanner.

Consumers can tap or wave their Nokia phones equipped with the vendor's SmartCover technology at any specially equipped PayPass reader at the point of sale. An RFID chip then transmits account and payment information to a terminal which is connected to the MasterCard payment network. A system provided by JP Morgan Chase & Co. then processes the account payment information. The entire process is designed to take only a few seconds.

Critics of the RFID approach are concerned with security problems, particularly with determining who is paying for a transaction. Also, a method of encryption of the wireless transmissions is necessary. Visa and NTT DoCoMo are also investigating using cellular phones to perform credit card transactions.

Three types of authentication are in general use in the present state of the art, RFID authentication, biometric authentication, and gadget-based authentication. RFID is already in use with speed pass by Exxon Mobile. A biometric system relies upon the use of a unique identifier, like a retinal scan or a fingerprint, to authenticate a transaction. A disadvantage of such systems is that wireless transactions using a biometric approach normally rely upon a central biometric repository to validate the user.

To make a cell phone easy to use for payments, it will have to be equipped with an infrared port, an RFID chip, and Bluetooth or some other kind of short-range wireless connector. Consumers want to quickly transfer their credit card information to a reader, not dial in on a cell phone and use up airtime minutes.

SUMMARY OF THE INVENTION

The present invention validates and authenticates minutiae based fingerprint transactions, and the disclosed embodiment uses wireless based communications systems, although the present invention could also use wire based communications systems. Minutiae points are unique identification points on a fingerprint where a ridge in the fingerprint joins another ridge or a ridge ends. The combination of any three minutiae points forms a triangle, and the method/algorithm of the present invention uses triangles of minutiae points because triangles are proportional regardless of possible differences in scale of two fingerprints being compared. A first method/algorithm uses a minutiae exchange where triplets of minutiae points are exchanged and form triangles for comparison between an original template of minutiae points and a stored template of minutiae points. A second method/algorithm exchanges three linear equations for three pairs of minutiae points that form triangles for comparison between an original template and a stored template.

The present invention uses the biometric security of fingerprint identification and the mobility and ease of wireless connectivity to perform secure transactions, and provides a secure method of fingerprint identification and authentication over wireless systems, which can frequently present a very hostile environment in which to operate.

The present invention combines the ability and ease of secure wireless technologies such as Bluetooth with biometric fingerprint identification based upon triangulation of minutiae points in the fingerprint. The fingerprint authentication provides a user with the security of authenticating with a unique personal identifier.

The present invention employs a transaction based process for the validation and authentication of a fingerprint. The fingerprint validation and authentication process does not transmit data on the full fingerprint during a transaction, and only transmits data on minutiae points of the fingerprint which are unique identification points on a fingerprint where a ridge in the fingerprint joins another ridge or a ridge ends.

BRIEF DESCRIPTION OF THE DRAWINGS

The foregoing objects and advantages of the present invention for a method and system for performing minutiae fingerprint transactions may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE INVENTION

Minutiae point verification is a commonly used standard for fingerprint authentication. After the extraction phase of the minutiae points, a template of minutiae points is established. Minutiae points are points in the fingerprint where ridges end or where two ridge converge or bifurcate. This template is used during the authentication process by comparing minutiae points of the original template to minutiae points of the candidate fingerprint.

Figure 1:
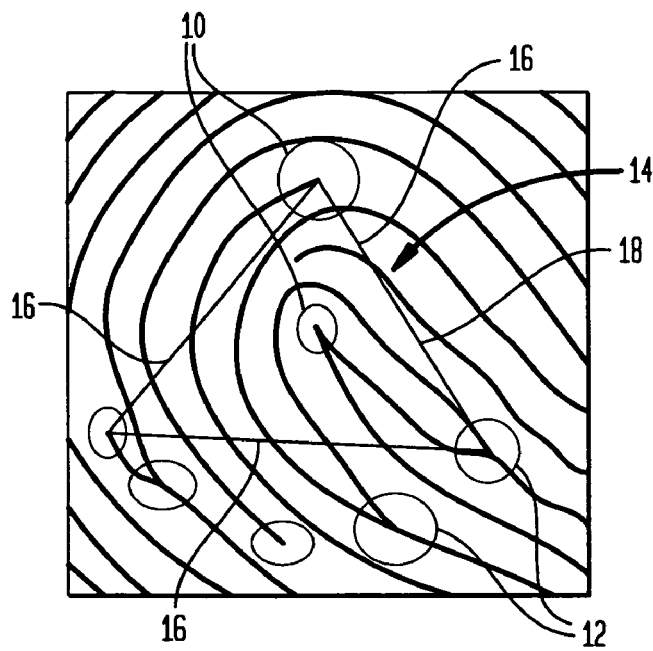
FIG. 1 illustrates several minutiae points on a fingerprint, and shows how ridges either end or join into another ridge, and also depicts a triangle formed by the intersection of three lines connecting pairs of minutiae points on the fingerprint.

FIG. 1 illustrates several minutiae points on a fingerprint, and shows how ridges either end at 10 or join into another ridge at 12.

The combination of any three minutiae points forms a triangle, such as triangle 14. In the method of the present invention, a first reference triangle of minutiae points is selected. In the disclosed embodiment, the first reference triangle is the largest triangle 14 of three minutiae points on a fingerprint, although other types of reference triangles (e.g. based upon angle or side 16 length proportions) might also be used in other embodiments. Triangles are used and are important because a triangle is proportional regardless of possible differences in scale of two fingerprints being compared. The angles formed in the triangle and the proportionality of the sides of the triangle are used to determine if the triangles are congruent. Congruency helps to determine proportionality of the two fingerprints in future transactions.

Figure 2:
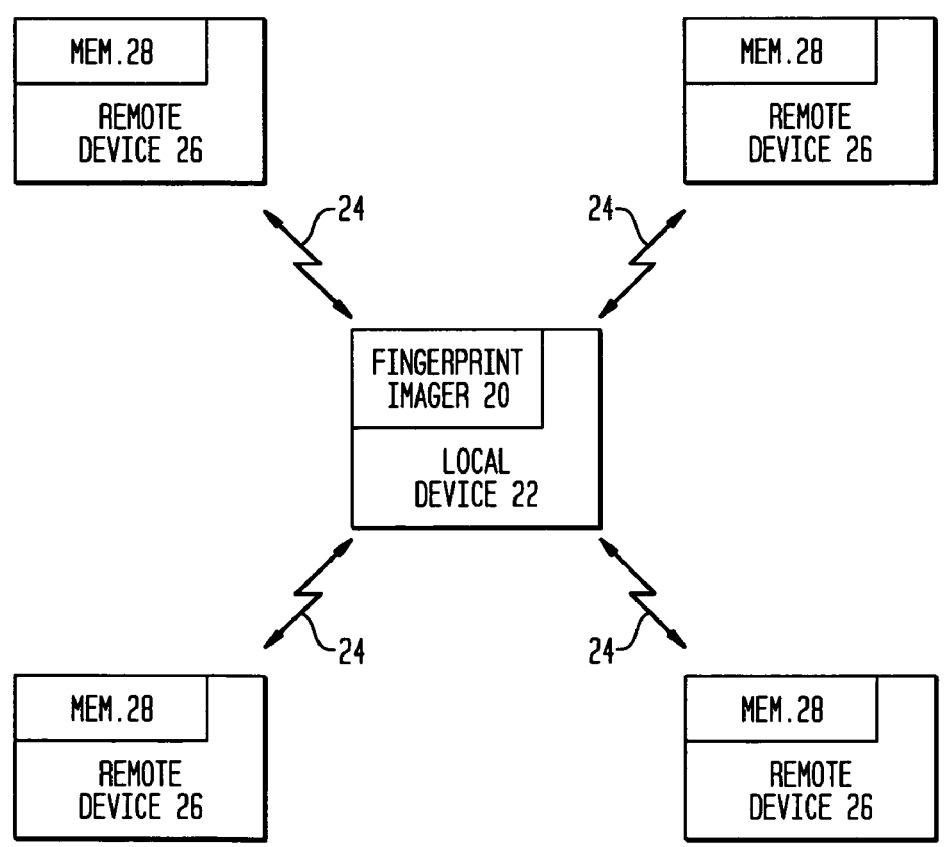
FIG. 2 illustrates a typical transaction wherein a user places their index finger on a fingerprint imaging/scanning system of a local authentication device, to capture an image of the original fingerprint, and the local device determines a reference triangle of minutiae points in the original fingerprint and then sends a wireless data transmission, with data describing the reference triangle, to all remote wireless authentication devices within the area.

Referring to FIG. 2, in a typical transaction wherein a user is being checked out at a retail establishment, the user places their index finger on a fingerprint imaging/scanning system 20 of a local authentication device 22 to capture an image of the original fingerprint. The local authentication device 22 determines the largest triangle of minutiae points in the original fingerprint (14 in FIG. 1), which can be determined through known area formulas for triangles. The local authentication device 22 then sends a wireless data transmission, shown schematically at 24, to all remote wireless authentication devices 26 within the area, with data describing this largest triangle. In the case of Bluetooth, all known remote authentication devices 26 discovered by the local authentication device would be queried. All remote authentication devices 26 compare the data describing the triangle sent by the device 20 with data stored in a storage memory 28 on the minutiae points of a plurality of possible candidate fingerprints to determine if two triangles are congruent by matching angles and matching proportionality of sides. Congruency can be determined by a match of the length of one side and two angles of the compared fingerprints, or by a match of the length of two sides and one angle of the compared fingerprints Each remote authentication device 26 compares the data on the angles and sides of triangles of candidate fingerprints stored in its memory 28 to determine if it has a match. If the remote authentication device 26 has a match of minutiae points, it sends back two of the original minutiae points of the reference triangle to the local authentication device 22. These two original minutiae points form an orientation reference side or vector that serves to orientate the minutiae points of the fingerprints for all future transactions of the authentication process.

After a remote authentication device 26 determines that it has a fingerprint in memory having a triangle matching the first reference triangle, it sends back to the local authentication device 22 data on two of the minutiae points of the reference triangle, to form the reference side, such as reference side 18 in FIG. 1, and also sends data on a new third minutiae point, not related to the first reference triangle, in the stored candidate fingerprint being compared with the original fingerprint. The orientation reference side or vector allows both the remote authentication device and the local authentication device to properly orient and align the new third minutiae point relative to the orientation reference side. When data on the third minutiae point is received by the local device 22, the fingerprint can be determined not to be a match if the original fingerprint does not have a minutiae point within a given threshold distance of the location of the third minutiae point sent in the previous transaction.

Assuming that the new minutiae point is validated, the local authentication device 22 sends a new minutiae point to all remote devices 26 that were validated in the previous transaction. Any remote device that was not validated during the previous transaction is removed from further validation processing. This protects the integrity of the fingerprint.

Each successive validation transaction results in an additional minutiae point being sent between the local authenticating device 22 and the wireless remote device 26. When either the wireless remote device or the local device validates a minutiae point, it send a new minutiae point back to the other device until all minutiae points are validated, or a threshold number of minutiae points are validated, and all other remote devices 26 have been ruled out as a candidate for a match to validate the financial transaction.

Security is provided for the fingerprint by only exposing minutiae points on a one to one basis between the local authenticating device 22 and the wireless remote device 26. Since both the local authenticating device 22 and the wireless remote device 26 exchange a new minutiae point with each transaction, both devices are actually validating the other device. This protects both the authenticating device 22 and the wireless remote device 26 from financial fraud. It is important to note that each side sends a new minutiae point when that side validates the minutiae point sent to it. This ensures that each side sends 50% of the fingerprint in a full authentication mode. This allows the fingerprint to serve as a private key, only exposing one position of the key during each validation cycle.

A common problem during an authentication process is protecting the security of the template of the original fingerprint and the security of the stored candidate template. In the prior art, an exchange of the entire template is required to compare the two templates. Full template exchange is not desirable because it leaves a security hole for hackers. By exchanging the entire template, someone may capture the template and reuse it in attempts to penetrate the host system. A portion of the template in a simultaneous exchange still leaves the template vulnerable.

The present invention provides two embodiments of methods of exchange for authentication while hiding the full template by using triangles, a Minutiae Exchange format and a Linear Exchange format.

The present invention does not focus on template exchange, and assumes that orientation estimation, segmentation ridge detection, and minutiae point detection have been performed already by preexisting algorithms, as is generally known in the art. After noise reduction and post processing of the minutiae point data, the two algorithms of the present invention can be implemented.

Minutiae Exchange

A research paper, "Fingerprint Matching Using Transformation Parameter Clustering", demonstrates using triplets of minutiae points to form triangles by creating lines connecting each minutiae point to the other two minutiae points.

FIG. 1 demonstrates the key features that can be captured in this process. The first feature is the creation of the triangle itself. The length of each side 16, the three angles formed by the triangle, and the number of ridges crossed by each side 16 can be easily determined. In addition, a vector indicating the end of a ridge or a bifurcation can also be determined. Researchers at Watson Labs used most of these features to create an algorithm for searching fingerprint databases called the Flash algorithm. The Flash algorithm creates an index based on nine components: the length of each side, the ridge count between each pair, and the angles measured with respect to a fiducial side, which is a vector representing the direction of the bifurcation.

Minutiae Exchange relies upon the research from Watson Labs by using the same values plus the angles formed by each side to determine if a candidate triangle is a possible match during the authentication process. The objective of Minutiae Exchange is to reduce the number of minutiae points sent to hide the full template of the fingerprint from being exposed, whether it is the original template or a stored template.

In a first phase of Minutiae Exchange, an original local device 22 (having data on the template of the original fingerprint) sends three minutiae points to one or more remote stored devices 26 (having the stored template). If there is a possible match, each stored device 26 that has a match with the triangle formed by the three points (length of sides and angles) responds back to the original device 22 by sending a directional reference vector/side for two of the minutiae points and one new minutiae point. If there is no match, the triangle is recorded on both sides as a rejection. The stored device 26 sends the reference vector to the candidate device 22 if it has a match. The stored device 26 then marks the triangle as used. The original device 22 also marks its triangle as used. This is important in determining whether or not there is a match of the original fingerprint to the candidate fingerprint.

After the first reference triangle has been exchanged between the two devices, the stored device transmits two of the original minutiae points to serve as the directional reference vector/side and one new minutiae point to the original device. The stored device 26 determines if it has a potential match by comparing the triangle and the vectors on its stored template in memory 28. A failure is recorded as a rejection. If there is a match, the stored device 26 returns data on a third new minutiae point unrelated to the first reference triangle. A success or failure is registered by both devices.

This process continues with the original device 22 initiating the transaction, and then the candidate device 26 initiating the transaction, as described in the previous paragraphs until a threshold of acceptance or rejection as is met. Once this threshold is met, the devices stop communicating in the case of a rejection. If the authentication is successful, the devices may proceed to further identification processes or consider themselves as authenticated.

Linear Exchange

Linear exchange is not intended to be a full authentication method. It is intended as a validation step that hides the values in the template while determining if the templates may be a possible match. In Linear Exchange, linear formulas in the form of y=mx+b are formed by determining the equation for the line that runs through two minutiae points. In a linear exchange, three lines are sent between the original device 22 and each stored device 26. When a transaction begins, the original device 22 determines three lines from six minutiae points. Before sending the lines, the original device ensures that one line has a negative slope, one line has a positive slope, and the slope of the third line is not equal to the slope of either of the other two lines. A threshold of acceptable slope difference can also be used so that two lines are not approximately parallel.

FIG. 1 depicts a triangle 14 formed by the intersection of the three lines. The objective is to form a triangle based on the linear equations of the minutiae points on the finger. The lines protect the location of the minutiae points because they do not reveal the point itself to the identification device. In rare cases, a triangle may not be formed because the lines will intersect at one given point. Also, an acceptable triangle threshold may be determined so that the triangle is not too large or too small.

Again, triangles formed by the intersections of the lines will form unique sides and angles that the stored device can compare to similarly sloped lines. The triangle is accepted or rejected by the stored device. If accepted, the stored device then sends three linear equations in the same fashion as the original. The original device accepts or rejects the triangle sent by the stored device. This continues until an acceptance threshold or a denial threshold is reached.

The Process

The present invention operates on the minutiae points of a fingerprint that have already been extracted by known techniques, such as described in "Fingerprint Classification and Matching", by Anil Jam and Shrath Pankanti.

Figure 3:
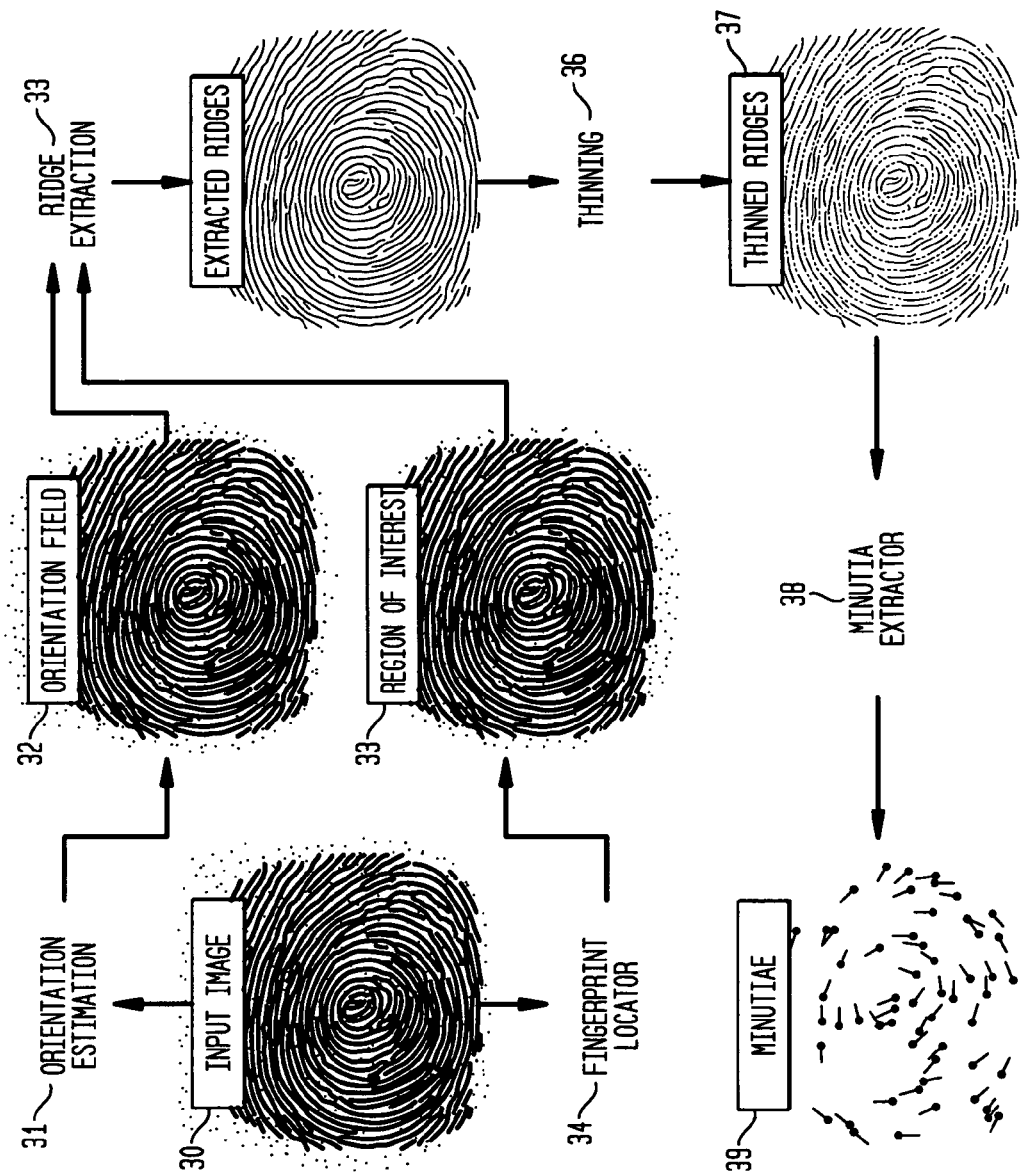
FIG. 3 is a schematic illustration of a prior art process of minutiae extraction.

FIG. 3 is a schematic illustration of the process of minutiae extraction. The process starts with the capture of an input image at 30, proceeds to orientation estimation at 31 in an orientation field 32, and proceeds to ridge extraction at 33. Data on the input image at 30 also proceeds to a fingerprint locator at 34 in a region of interest 35, to the ridge extraction at 33, to thinning of the ridges at 36 to obtain thinned ridges 37, and then to minutiae extraction at 38 to obtain the minutiae points 39 of a template.

Linear Exchange Minutiae Exchange Template Comparison Authentication

Each transaction of authentication reveals more of the template than the previous transaction. The objective is to protect the template until it is accepted at each transaction. A linear exchange reveals the least about the template because it does not exchange actual minutiae points. A minutiae point could be anywhere on the line created by the two minutiae. A minutiae exchange sends a limited authentication between the original device and the storage device by only sending one triplet at a time, and by validating the directional vectors of the ridges in a separate transaction. The actual template can be exchanged for a final authentication. In some cases to ensure security, a PIN number could be required before sending the final template.

The present invention provides a method for identifying a fingerprint wirelessly and securely. The entire fingerprint template is not sent for identification; the fingerprint template remains hidden, and at most, only half of the fingerprint template is sent in any one direction. An algorithm securely authenticates matching fingerprints wirelessly without the need for authenticating a fingerprint with a backend system having a full central repository of fingerprints.

The present invention assumes an equal relationship between the local original device and the remote stored devices. Both the original device and the stored devices infer a level of security by communicating triangles to each other and only 50% of the template is exposed either way. Each remote device also participates in using the authenticating algorithm to authenticate the fingerprint; the remote device is not just a repository for storing a copy of the fingerprint.

The present invention inherently provides security in a wireless environment through bluetooth, and an ssl (secure sockets layer) layer protocol can be setup in the case of regular tcp/ip (protocol for network communications over the internet) communications.

While several embodiments and variations of the present invention for a minutiae fingerprint transactions are described in detail herein, it should be apparent that the disclosure and teachings of the present invention will suggest many alternative designs to those skilled in the art.

What is claimed is:

1. A method for authenticating a user, comprising the steps of:

acquiring an image of an original fingerprint of the user at a local authentication device, and identifying minutiae points on the original fingerprint image where a ridge in the fingerprint joins another ridge or a ridge ends, and the combination of any three minutiae points forms a triangle, with triangles being proportional regardless of possible differences in scale of two fingerprints being compared, and the local authentication device determining a reference triangle of three minutiae points in the original fingerprint;

the local authentication device transmitting data relating to the reference triangle of minutiae points in the original fingerprint to a plurality of remote authentication devices, each remote authentication device performing a validation function upon the original fingerprint image utilizing data related to the reference triangle to determine if it has a stored candidate fingerprint in memory having a triangle matching the reference triangle, and if so the remote authentication device sends back to the local authentication device data on two of the minutiae points of the reference triangle to form a reference side, and also sends data on a third new minutiae point, not related to the reference triangle, in the stored candidate fingerprint;

when data on the third new minutiae point is received by the local authentication device, the local authentication device can determine the stored candidate fingerprint not to be a match if the original fingerprint does not have the third new minutiae point, and if the third new minutiae point is validated, the local authentication device sends a fourth new minutiae point to the remote device, and each successive validation transaction results in an additional minutiae point being sent between the local authenticating device and the remote authentication device until the authentication method determines a match.

2. The method of claim 1, wherein the local device sends data on the fourth new minutiae point to all remote devices that were validated in the previous transaction, and any remote device that was not validated during the previous transaction is removed from further validation processing to protect the integrity of the fingerprint.

3. The method of claim 2, wherein the authenticatine method determines a match when a threshold number of minutiae points are validated, and all other remote devices have been removed as a candidate for a match in the authenticating method.

4. The method of claim 1, wherein the authenticating method uses a minutiae exchange where triplets of minutiae points are exchanged and form triangles for comparison between an original template of minutiae points and a stored template of minutiae points.

5. The method of claim 1, wherein the authenticating method uses an exchange of three linear equations for three pairs of minutiae points that form triangles for comparison between an original template of minutiae points and a stored template of minutiae points.

6. The method of claim 1, wherein the local device determining line equations for first, second and third lines connecting first, second and third pairs of minutiae points located on the image of the original fingerprint, wherein the first line has a positive slope, the second line has a negative slope, and the third line has a slope that is not equal to the positive slope or the negative slope, and wherein intersections of the first, second and third lines form a triangle.

7. The method of claim 6, further comprising the step of transmitting the line equations to the plurality of remote devices, wherein each remote device compares the triangle formed by the transmitted line equations to triangles formed by line equations for three pair of minutiae points located on fingerprint images stored within a storage means of the remote device.

8. The method of claim 7, wherein if a remote device determines that the triangle formed by the transmitted lines is congruent to a triangle formed by line equations for pairs of minutiae points located upon a stored fingerprint image, then the remote device transmits three new line equations to the local device for comparison, and the transmittal of line equations between the local device and the remote device continues until either device determines that a triangle being compared is not congruent or a predetermined acceptance threshold has been reached.

9. The method of claim 8, further comprising the step of transmitting the coordinates of the triangle to the remote devices, wherein each remote device compares the coordinates of the transmitted triangle to the minutiae points of their stored fingerprint images to determine if their stored images contain a matching image.

10. The method of claim 1, wherein the transmittal of new minutiae points between the local device and the remote device continues until either device determines that a triangle being compared is not congruent or a predetermined acceptance threshold has been reached.

11. A method for authenticating a user, comprising the steps of:

acquiring an image of an original fingerprint of the user at a local authentication device, and identifying minutiae points on the original fingerprint image where a ridge in the fingerprint joins another ridge or a ridge ends, and the combination of any three minutiae points forms a triangle, with triangles being proportional regardless of possible differences in scale of two fingerprints being compared;

the local authentication device transmitting data relating to selected minutiae points in the original fingerprint to a plurality of remote authentication devices, each remote authentication device performing a validation function upon the original fingerprint image utilizing data related to the selected minutiae points in the original fingerprint to determine if it has a stored candidate fingerprint in memory matching the original fingerprint, and if so the remote authentication device sends back to the local authentication device data on a new minutiae point, not related to the selected minutiae points in the original fingerprint;

when data on the new minutiae point is received by the local authentication device, the local authentication device can determine the stored candidate fingerprint not to be a match if the original fingerprint does not have the new minutiae point, and if the new minutiae point is validated, the local authentication device sends a further new minutiae point to the remote device, and each successive validation transaction results in an additional new minutiae point being sent between the local authenticating device and the remote authentication device until the authentication method determines a match.

12. The method of claim 11, wherein the local device sends data on the further new minutiae point to all remote devices that were validated in the previous transaction, and any remote device that was not validated during the previous transaction is removed from further validation processing to protect the integrity of the fingerprint.

13. The method of claim 12, wherein the authenticating method determines a match when a threshold number of minutiae points are validated, and all other remote devices have been removed as a candidate for a match in the authenticating method.

14. The method of claim 11, wherein the authenticating method uses a minutiae exchange where triplets of minutiae points are exchanged and form triangles for comparison between an original template of minutiae points and a stored template of minutiae points.

15. The method of claim 11, wherein the authenticating method uses an exchange of three linear equations for three pairs of minutiae points that form triangles for comparison between an original template of minutiae points and a stored template of minutiae points.

16. The method of claim 11, wherein the local device determining line equations for first, second and third lines connecting first, second and third pairs of minutiae points located on the image of the original fingerprint, wherein the first line has a positive slope, the second line has a negative slope, and the third line has a slope that is not equal to the positive slope or the negative slope, and wherein intersections of the first, second and third lines form a triangle.

17. The method of claim 16, further comprising the step of transmitting the line equations to the plurality of remote devices, wherein each remote device compares the triangle formed by the transmitted line equations to triangles formed by line equations for three pair of minutiae points located on fingerprint images stored within a storage means of the remote device.

18. The method of claim 17, wherein if a remote device determines that the triangle formed by the transmitted lines is congruent to a triangle formed by line equations for pairs of minutiae points located upon a stored fingerprint image, then the remote device transmits three new line equations to the local device for comparison, and the transmittal of line equations between the local device and the remote device continues until either device determines that a triangle being compared is not congruent or a predetermined acceptance threshold has been reached.

19. The method of claim 18, further comprising the step of transmitting the coordinates of the triangle to the remote devices, wherein each remote device compares the coordinates of the transmitted triangle to the minutiae points of their stored fingerprint images to determine if their stored images contain a matching image.

20. The method of claim 11, wherein the transmittal of new minutiae points between the local device and the remote device continues until either device determines that a triangle being compared is not congruent or a predetermined acceptance threshold has been reached.

* * * * *